(No Model.)
C. M. MURCH.
Passenger Vehicle.
No. 230,041. Patented July 13, 1880.
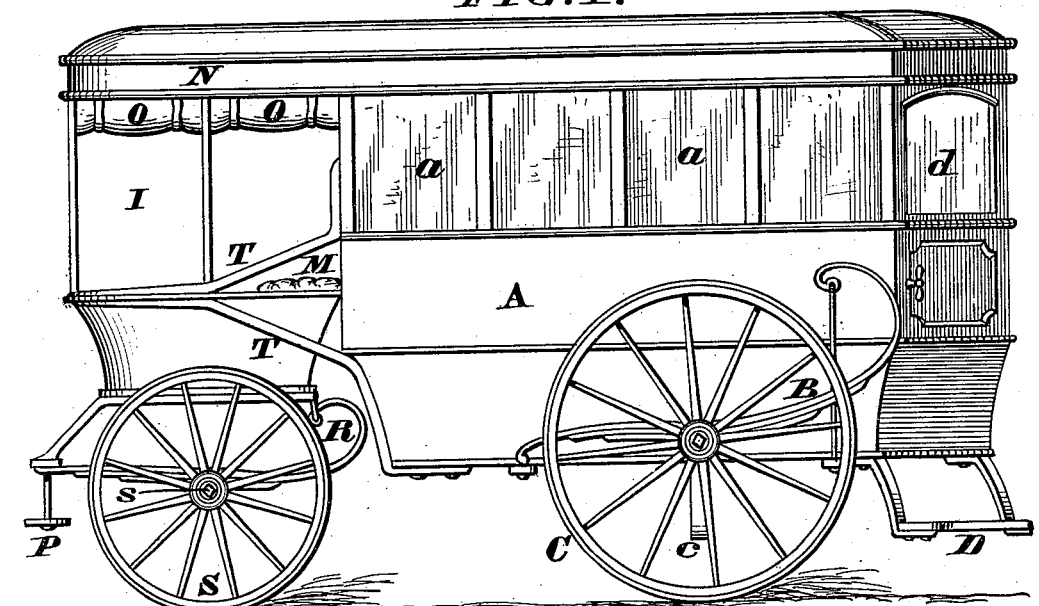
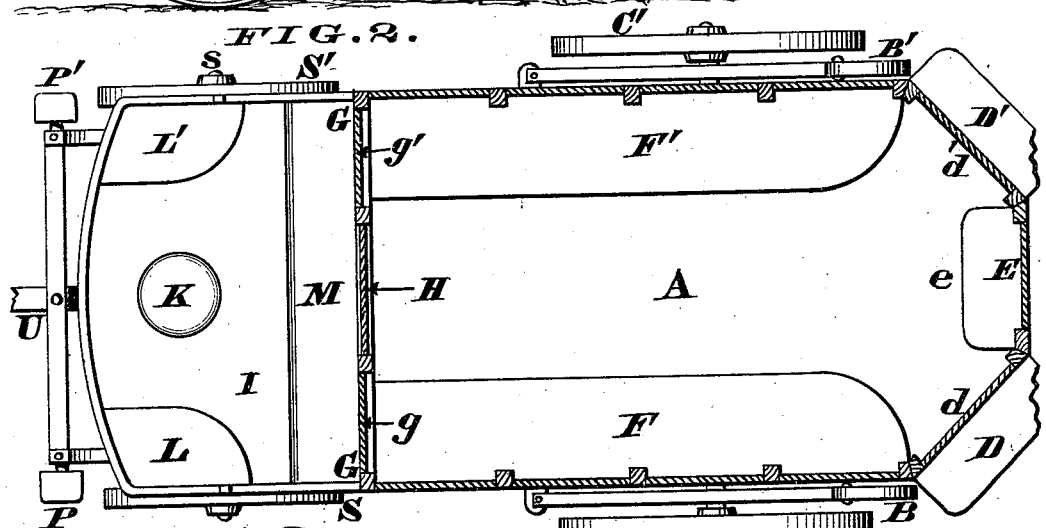
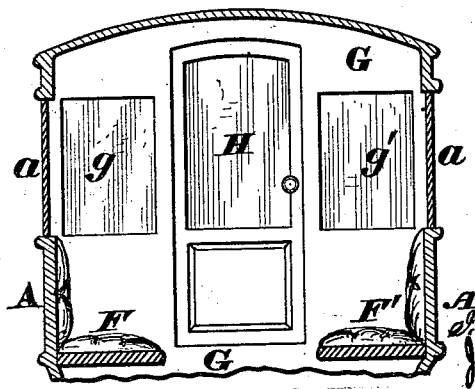

UNITED STATES PATENT OFFICE.

CHAUNCEY M. MURCH, OF CINCINNATI, OHIO.

PASSENGER-VEHICLE.

SPECIFICATION forming part of Letters Patent No. 230,041, dated July 13, 1880.

Application filed April 17, 1880. (No model.)

*To all whom it may concern:*

Be it known that I, CHAUNCEY M. MURCH, of Cincinnati, Hamilton county, Ohio, have invented certain new and useful Improvements in Passenger-Vehicles, of which the following is a specification.

The object of my invention is to enhance the utility and convenience of the peculiar form of passenger-vehicles seen in the patents granted to me February 10, 1874, and May 26, 1874; and the present improvement consists in applying a cabin or saloon to the front end of the main body of the car or wagon. This saloon is entirely separate and distinct from the main body of the vehicle, is open in front and at both sides, but is covered at top with a canopy, which latter is an extension of the car-roof. Furthermore, said cabin is furnished with curtains to protect the passengers from the inclemencies of the weather, and is provided with two side or angle seats, a transverse seat, and a stool for the driver, which stool is preferably arranged so as to be capable of vertical adjustment. Access may be had to this saloon either by steps applied to the front running-gear or through a sliding door fitted in a partition or bulk-head interposed between said saloon and the main body of the vehicle, as hereinafter more fully described.

In the annexed drawings, Figure 1 is a side elevation of my improved form of passenger-vehicle. Fig. 2 is a horizontal section of the same. Fig. 3 is a transverse section of a portion of the main body. Fig. 4 is an enlarged vertical section of a portion of the saloon of the vehicle, taken in the plane of the driver's seat.

The main body A of the vehicle is suspended upon springs B B', which are preferably constructed in the manner described in my patent of April 13, 1880, and said springs have their bearings upon the bent axle $c$ of the rear wheels, C C'. Access is had to the interior of this body by means of two oblique steps, D D', and correspondingly-disposed doors $d\ d'$, a pier, E, being interposed between said doors, which pier constitutes the extreme rear end of the vehicle, and may have a window in it on the same level as the windows $a$ of said body. Interiorly this body has two side or longitudinal seats, F F', and a single transverse seat, $e$, which latter is fastened to the pier E.

Extending completely across the front end of this part of the vehicle is a partition or bulk-head, G, having two side lights, $g\ g'$, and a central sliding door, H, which latter, when shifted aside, affords convenient access to the cabin or smoker's saloon I. This saloon is open in front and at both sides, and has secured to it a standard, J, which supports the vertically-adjustable driver's seat K. Furthermore, this saloon has two side seats, L L', and a transverse one, M, which latter extends completely across the vehicle, immediately in front of the partition G. This saloon is protected by a canopy, N, which is simply a prolongation of the roof of the vehicle.

O are curtains, which may be lowered during inclement weather.

Attached to the front running-gear of the vehicle are steps P P', which afford additional means of access to or egress from the cabin or saloon I, the saloon being supported on springs R, bearing upon the front axle, $s$, of wheels S S'.

T is a system of angle-iron braces, which connect the cabin I to the main body A of the vehicle. U is the draft-pole.

The general frame-work of the vehicle is composed of angle-iron, whose peculiar form and mode of attachment are fully illustrated and described in a number of patents already issued to me, and to which patents reference may be had for these details of construction.

One great advantage possessed by this vehicle over either of the ones previously patented to me is seen in the provision of the cabin I, which affords ample accommodation for six or eight persons in addition to the driver, and as this part of the vehicle is entirely cut off from the other portion, A, it is evident said cabin may be used as a smoker's saloon without in the least annoying any of the passengers occupying the seats F F'.

Furthermore, the front seats, K L L' M, are not exposed, as in my old patent, but are housed in by the canopy N and curtains O, so as to effectually protect passengers from the inclemencies of the weather.

In addition to these advantages, the present construction enables passengers to have access to the saloon I, either through the door H or by the steps P P'.

I claim as my invention—

In a passenger-vehicle, the covered saloon I N, containing the driver's seat K, angle-seats L L', and transverse seat M, access being had to this covered saloon by the door H, applied to the partition G at the front end of body A, as herein described.

In testimony of which invention I hereunto set my hand.

CHAUNCEY M. MURCH.

Witnesses:
JAMES H. LAYMAN,
J. F. TWOHIG.